J. D. KELLER

FLOW METER

Filed August 2, 1922   5 Sheets-Sheet 2

J. D. KELLER

FLOW METER

Filed August 2, 1922

INVENTOR.
J. D. Keller
BY Edward A. Lawrence
his ATTORNEY.

INVENTOR.
J.D.Keller.

Patented Apr. 20, 1926.

1,581,957

UNITED STATES PATENT OFFICE.

JOHN DONALD KELLER, OF PITTSBURGH, PENNSYLVANIA.

FLOW METER.

Application filed August 2, 1922. Serial No. 579,228.

*To all whom it may concern:*

Be it known that I, JOHN DONALD KELLER, a citizen of the United States, residing at Pittsburgh, in the county of Allegheny and State of Pennsylvania, have invented new and useful Improvements in Flow Meters, of which the following is a specification.

My invention relates to means for accurately measuring the rate of flow of fluids, gases, or vapors and for visually or otherwise indicating accurately the rate of flow, whether steady or pulsating.

It is one object of this invention to provide means which will produce a pressure difference proportional approximately to the square of the rate of flow in a pipe or duct, this pressure difference varying, with little or no mechanical motion, an electrical potential or current in proportion approximately to the square root of the pressure differences, and thus proportional either exactly or substantially at each instant to the rate of flow at that instant. My invention includes means for transmitting the potential or current to a distance, and indicating at a distance the average rate of flow.

Referring to the accompanying drawings.

Figure 1:
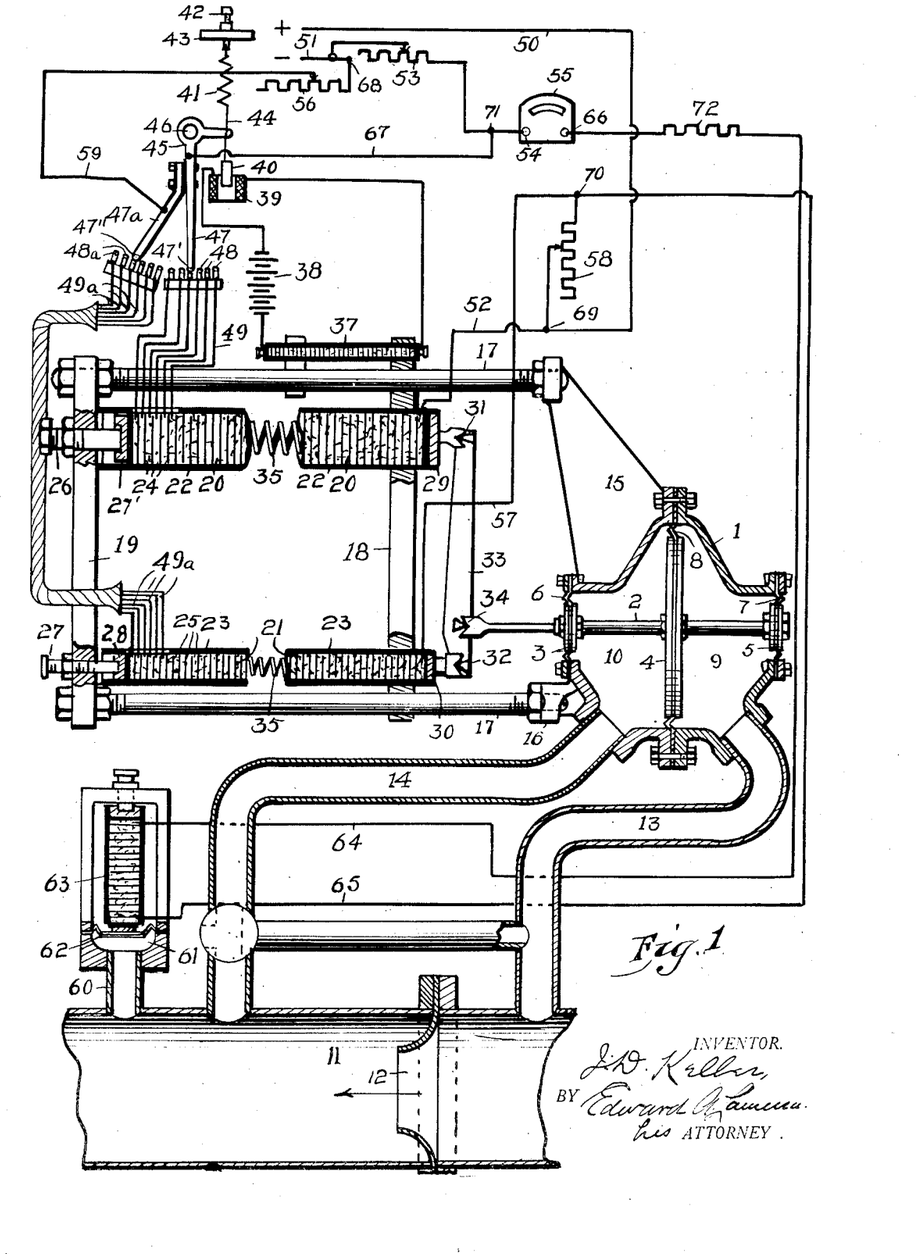
Fig. 1 is a vertical section through the flow measuring device, portions being shown diagrammatically.

On the drawings, 1 designates a casing having the preferably horizontal stem 2 carrying the pairs 3, 4, and 5 of disks, the disks 3 and 5 being preferably of equal diameters and carrying the flexible diaphragms 6 and 7 clamped to the ends of the casing and forming with the disks 3 and 5 end closures therefor. The disks 4 are preferably larger than the other disks and carry a flexible diaphragm 8 clamped between sections of the casing, the disks 4 and the diaphragm 8 dividing the interior of the casing into two chambers 9 and 10.

Figure 10:
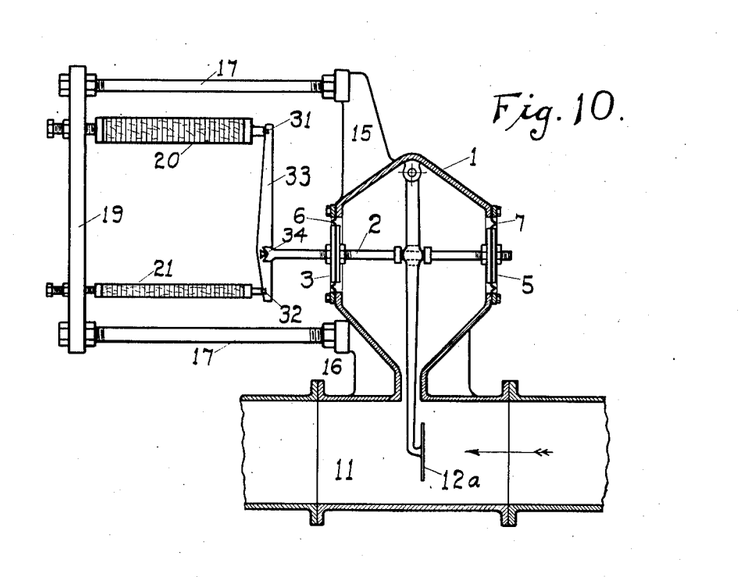
Fig. 10 is a vertical section through a modification in which an impact vane is substituted for the orifice and diaphragm of Fig. 1.

11 is a pipe carrying a fluid, such as steam, for example, flowing in the direction indicated by the arrow therein. In the pipe is the transverse partition or plate having the orifice 12 rounded or contracted in the direction of fluid flow. In some cases, a Venturi tube, or a Pitot tube, or a sharp-edged throttle-disk or orifice, or an impact vane acting through a lever upon the stem 2 as shown in Fig. 10, may be used in place of the orifice 12 to produce a differential pressure of the fluid flowing through the pipe. A pipe 13 connects the chamber 9 to the pipe 11 on the inlet or upstream side of the orifice 12, and a pipe 14 connects the chamber 10 to the pipe 11 on the outlet or down-stream side of the orifice. Where an impact vane is used, I dispense with the disks 4 and diaphragm 8 and cause the vane to exert endwise pressure directly on the stem by means of a lever as shown in Fig. 10.

Figure 7:
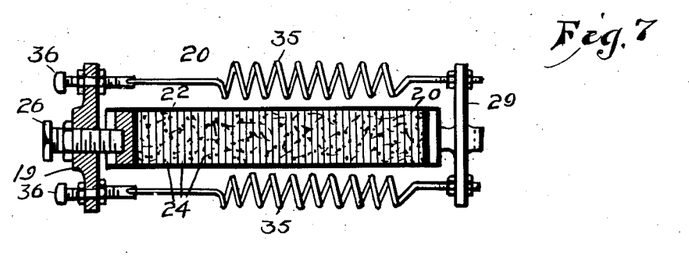
Fig. 7 is a central longitudinal section of the pile 20 and the parts adjacent thereto.

The casing 1 has the arms 15 and 16 which support the horizontal rods 17, to which are secured the spaced heads 18 and 19. The head 18 has openings to receive one end of each of the electric compressible or pressure-variable resistance-piles 20 and 21 having respectively the insulating casings 22 and 23 containing respectively a series of flat plates, blocks or disks 24 and 25 fitting loosely therein and composed preferably of carbon or graphite, although other conducting materials may be used, such as silicon or aluminum, or mixtures of carbon with other materials. If preferred the material may be granular. The remaining ends of the piles may rest against the head 19 which carries adjusting screws 26 and 27 engaging the block 27' and 28 on the left hand ends of the piles. The right hand ends of the piles have the blocks 29 and 30 resting against the left hand disks 24 and 25 and have knife-edge connections 31 and 32 with the lever 33, which has a knife-edge connection 34 with the end of the stem 2. The blocks 29 and 30 may be connected by the springs 35 to adjusting screws 36 carried by the head 19, so as to give the piles initial pressures if and as desired. These springs are shown more clearly in Fig. 7. The disks 24 and 25 are insulated both from screws 26 and 27 and from blocks 29 and 30.

37 is a carbon resistance placed near to the pile 20 so as to be subject to the same temperature conditions, and is placed in series with the battery 38 or other source of current and the solenoid winding 39 containing the steel core 40 suspended by the spring 41 which is connected to the adjusting screw 42 in a suitable support 43. A wire 44 connecting the core and the spring is connected to one arm of the bell-crank lever 45 rocking on the pivot 46, another and longer arm 47 of the lever having a contact 47' engageable with a series of contacts 48, preferably comprising mercury cups, connected to taps 49 leading to some of the consecutive right-hand disks 24, or to metal disks separating the carbon disks.

The arm 47 is duplicated by the arm 47ª insulated therefrom and having a contact 47'' arranged to engage the contacts 48ª at the ends of the separate taps 49ª which are connected to some of the consecutive members 25 of the pile 21. The arm 47ª is connected to the wire 59 leading to the point 68 through resistance 56.

It is well known that the resistance in piles such as 20 and 21 tends to diminish as the temperature of their plates increases. To counteract this effect, the carbon thermostatic element 37 is used, which is subject substantially to the same temperature as the piles 20 and 21, and varies its resistance as its temperature changes, causing the current in the solenoid 30 to vary. Thus if the temperature rises, the increasing flux from the solenoid causes its core to move down and make the contacts 47' and 47'' move to the left (in Fig. 1) over some of the contacts 48 and 48ª connecting into the circuits more of the members 24 and 25 so as to increase the resistance of the piles to the original value. When the temperature falls, the reverse action occurs. Accordingly, the resistance of the piles for each certain pressure is kept constant regardless of the temperature of the piles. The local circuit for the resistance 37 might receive current from the lines 50 and 51 instead of from the battery 38.

50 and 51 are current supply lines from a source of constant voltage. The line 50 is divided at the point 69 and the line 51 at the point 68, one branch leading from the point 68 through the resistances 56 and 21, the wire 57 and the resistance 58 to the point 69, and the other branch from the point 68 through the resistance 53, the wire 67, the resistance 20, and the wire 52 to the point 69.

60 is a pipe connecting the pipe 11 on the low pressure side of the orifice 12 to the chamber 61 whose upper end is closed by the plate and flexible diaphragm 62 in engagement with the lower end of a pressure-variable resistance 63, constructed preferably like the piles 20 and 21. The pile 63 is thus subjected to the static pressure of the fluid pipe 11. The opposite ends of the resistance 63 are connected by the wires 64 and 65 to the remaining meter terminal 66 and the point 70 between the resistances 21 and 58. The meter terminal 54 is connected to the point 71 between the resistances 20 and 53.

Assuming that steam, for example, is flowing in the pipe 11 in the direction indicated by the arrow in Fig. 1, there exists a difference of steam pressure at opposite sides of the orifice 12, the smaller pressure being on the down-stream side thereof. These pressure differences are proportional approximately to the squares of the rates of flow, or the rates of flow are proportional to the square roots of the pressure differences. The two pressures are transmitted through the pipes 13 and 14 to the chambers 9 and 10; and, as the pressure in the chamber 9 is the greater, the stem 2 will transmit the differential of the pressures to the lever 33. The lever arm between the knife-edges 32 and 34 is shorter than the lever arm between the knife-edges 31 and 34, or the cross-sectional area of the pile 21 is made smaller than that of the pile 20, or both of said relations between the lengths of the lever arms and between the cross-areas of the piles may obtain, as shown on Fig. 1, the object being to produce a pressure on the pile 21 which is greater than, and is a constant multiple of, the pressure exerted on the pile 20. This result may be brought about by a different lever system, either simple or compound, with the view of either multiplying or decreasing the relative pressures exerted on the piles by the differential pressure of the steam in the chambers 9 and 10.

Figure 2:
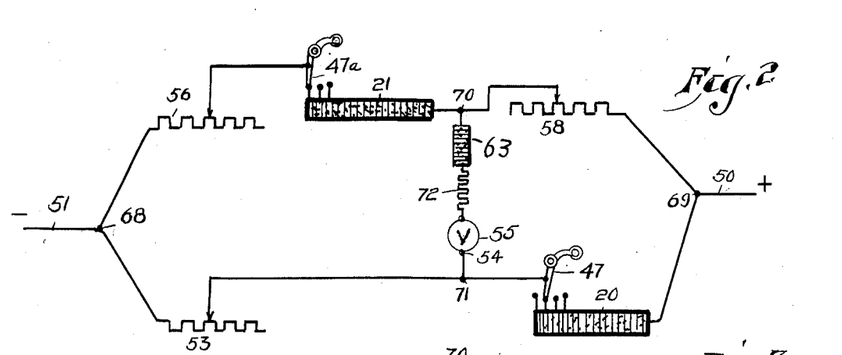
Fig. 2, a diagram of the preferred arrangement of the electrical devices and connections for the usual operating conditions.

Fig. 2 is a simplified diagram of the electrical circuits and instruments shown in Fig. 1. It is seen that they are arranged in a manner similar to a Wheatstone bridge. The points 68 and 69 should be maintained at constant potential or voltage. 72 is a resistance placed in series with the voltmeter and across the points 70 and the meter terminal 66, but it may be omitted, if a voltmeter is used having the proper resistance.

Still referring to Fig. 2, I choose the resistances so that, when the pressures in both the chambers 9 and 10 are equal, the ratio of the resistance 53 to the resistance of the pile 20 is equal to the ratio of the sum of the resistance 56 and that of the pile 21, to the resistance 58, so that no difference of potential exists between the points 70 and 71 and no current flows through the voltmeter 55. As soon as the pressure in the chambers 9 and 10 become unbalanced, the resistances of the piles 20 and 21 change their values in different ratios, causing a difference of potential at the points 70 and 71, whereupon the voltmeter indicates this potential difference. I choose the ratios of the resistances, of the leverages and of the areas of piles 20 and 21, so that the potential difference at the points 70 and 71 is proportional exactly to the square root of the differential pressure acting on plate 4 and diaphragm 8, or substantially so. These ratios depend somewhat upon the properties of the conducting material in the piles 20 and 21.

Ordinary flow meters produce pressure differences which are proportional to the square of the rate of flow, but, when used for measuring pulsating flow, these meters average the instantaneous pressure differences, and indicate the square root of the average pressure differences. This results in serious errors, because the true flow is proportional to the average of the square roots of the instantaneous differences and not to the square roots of the average pressure differences. In my invention, the electrical potential at the points 70 and 71 at each instant is caused to vary in such a manner that it is proportional to the square root of the instantaneous pressure difference, or proportional to the rate of steam flow at that instant. These instantaneous potentials are averaged by the electrical indicating instrument, which shows a correct indication of the average steam flow.

Figure 3:
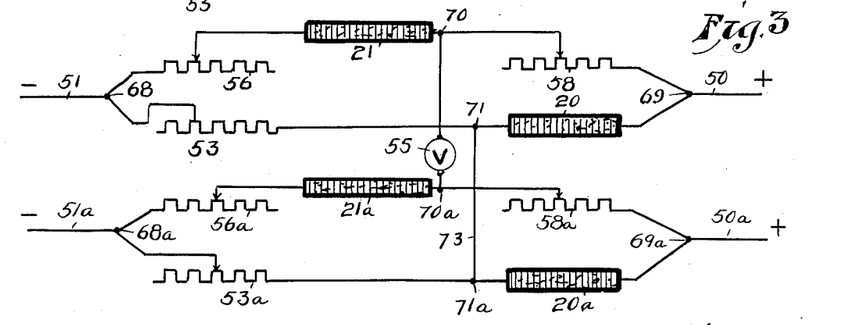
Fig. 3, a diagram of the character of Fig. 2, but adapted to cases where back flow exists.
Figure 11:
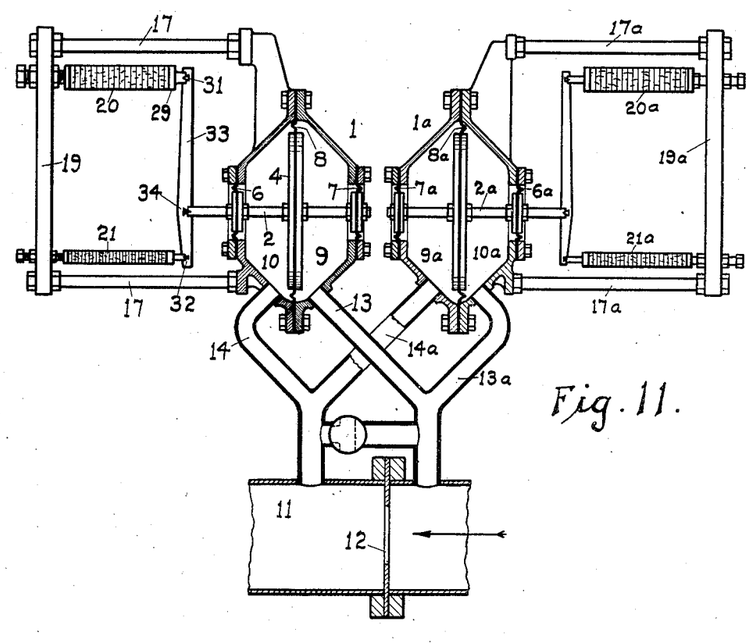
Fig. 11, a vertical section through a duplicate apparatus for measuring flow which is not only pulsating but oscillating.

In cases where oscillations of flow occur in the pipe 11 so that back flow through the orifice 12 occurs, I provide a separate additional apparatus like Fig. 1, but I reverse the connections of the pipes corresponding to the pipes 13 and 14 so that they will lead to the chambers corresponding to the chambers 10 and 9 respectively as shown in Fig. 11. The electrical connections for this modification are shown in Fig. 3, in which and in Fig. 11 the parts identical with Fig. 2 have the same reference numbers, and in which parts analogous to those parts are given the same reference numerals with the letter "a" added. The voltmeter 55 is connected across the points 70 and 70ª, and the points 71 and 71ª are connected by the wire 73. The sources of supply to the lines 50—51, and to 50ª—51ª are not electrically connected. The potentials are so adjusted that the ratio of the potential difference between the points 68ª and 69ª to the potential difference between the points 68 and 69 is equal to the ratio of the coefficient of discharge through the orifice 12 at back flow, to that at forward flow, proper connections being made for the velocity of approach effects. For example, if the coefficient of discharge for flow through the orifice in the direction indicated by the arrow in Fig. 1 is .98, and the coefficient for flow in the opposite direction is .53, the ratio is .54, and the ratio of potential difference between the points 68ª—69ª to the potential difference between the point 68—69 is made equal to .54.

Figure 12:
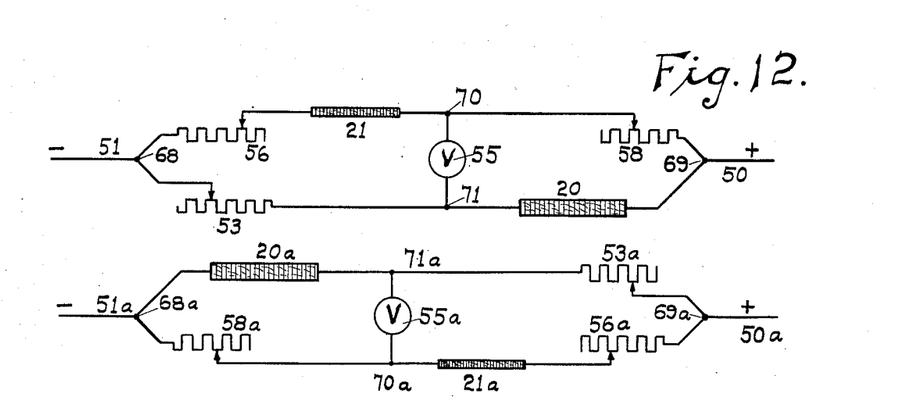
Fig. 12, a diagram showing the electrical connections in the modification in which separate electrical meters are used for measuring forward flow and back flow.
Figure 13:
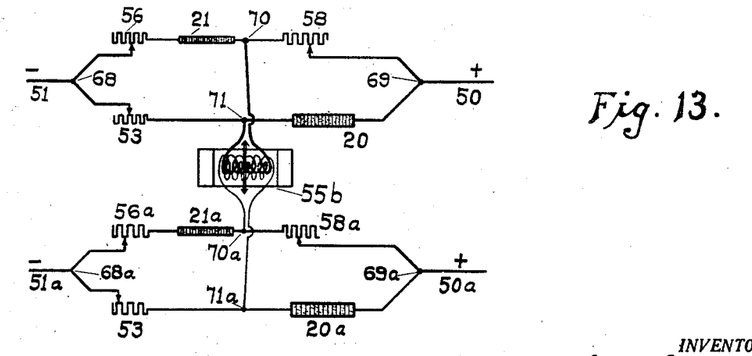
Fig. 13, a diagram of the electrical connections for the modification in which a special double-coil electrical meter is used for both forward and back flow.

Instead of employing the cross-connections between the upper and lower portions of Fig. 3, I may connect one voltmeter across the points 70 and 71, as in Figs. 1 and 2, and another voltmeter across the points 70ª and 71ª, that is, I may use duplicate apparatuses like Fig. 1, with one apparatus having the connections of the pipes 13 and 14 reversed with respect to the chambers 9 and 10. This modification is shown in Fig. 12. In this case I subtract the reading of the back flow meter from that of the forward flow meter. I may use only one meter with two coils, one connected across the points 70 and 71, and the other reversely connected across the points 70ª and 71ª as shown in Fig. 13.

Figure 4:
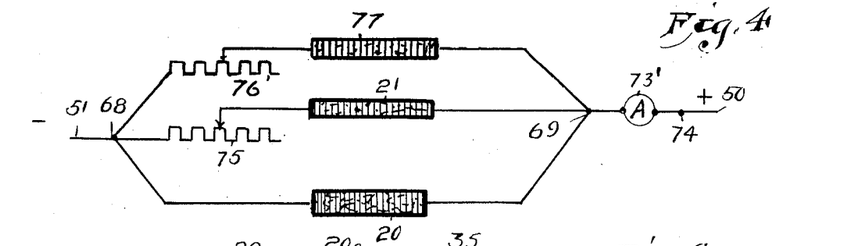
Fig. 4, a diagram showing the electrical devices and connections where an ammeter is used instead of a voltmeter.

Instead of using the voltmeter and the Wheatstone bridge arrangements shown, I may use an ammeter as the indicating instrument, with the connections shown on Fig. 4. The potentials at points 68 and 74 are kept constant, the ammeter 73' being between the points 69 and 74. The ratio of pressure exerted on the piles 20 and 21, and of the resistances 75, 76 and 77, are so chosen that the increase of current varies approximately as the square root of the pressure differences in the pipe 11 or in the chambers 9 and 10. With this arrangement some current flows even when no pressure difference exists, but obviously this may be compensated for by changing the zero setting of the ammeter.

In cases where the fluid flowing in the pipe 11 is a gas or a vapor, the density of which changes with the static pressure, I may correct for this variation of density by the use of the pile 63 and the parts cooperating with it. As the pressure and density of the fluid increases in the pipe 11, the resistance of the pile 63 decreases. The proportions are chosen such that the voltage impressed upon the indicating instrument is directly proportional to the weight of fluid flowing in a unit of time, regardless of the changes of density.

Figure 5:
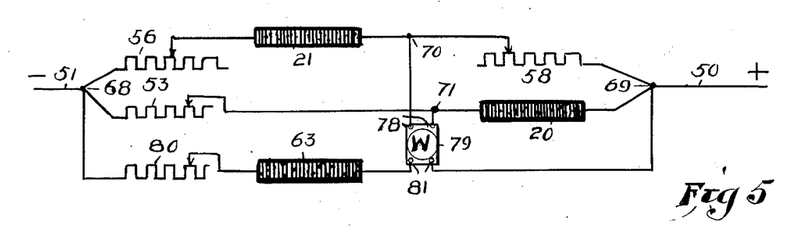
Fig. 5, a diagram showing the electrical devices and connections where a wattmeter or a watt-hour meter is used.

I may use a wattmeter for the indicating instrument with connections shown in Fig. 5, in which the points 70 and 71 are connected to the voltage terminals 78 of the wattmeter 79, while the resistance pile 63 and the resistance 80 are connected in series with the current terminals 81 of the meter.

Meters having any suitable indicating means may be used, such as dials and pointers. Where a permanent record of the rate of flow at all times is desired, the usual types of recording voltmeters, ammeters or wattmeters may be used having charts with proper scales or divisions to denote correct rate of flow.

For integrating the total flow during any period of time, I may substitute for the wattmeter 79 a watt-hour meter. For integrating the total flow, but using the circuit of Fig. 2, I may use any of the usual types of integrator, such as the type consisting of a time-clock which drives a disc, on which rotates a small wheel moved radially by the action of the voltmeter to varying distances from the center of the disc.

I may calibrate the scales of the meters 55 and 79 to read rate-of-flow directly, or may calibrate them in volts or watts, and use charts or graphs for ascertaining the corresponding rate of flow. Many other changes may be made in my invention without departing from the spirit thereof.

Instead of mounting the pressure-variable resistances 20 and 21 as shown in Fig. 1, I may arrange them within the diaphragm casing 1. To accomplish this I prefer the structure shown in Fig. 6 where I employ the casing 1a having the chambers 9a and 10a. Both ends of the casing are closed, and the left-hand end sustains the pressure of the adjacent ends of the resistances 20 and 21, while pressure is transmitted to the right-hand ends of the said resistances through the lever 33 and the stem 2a.

Figures 6, 8:
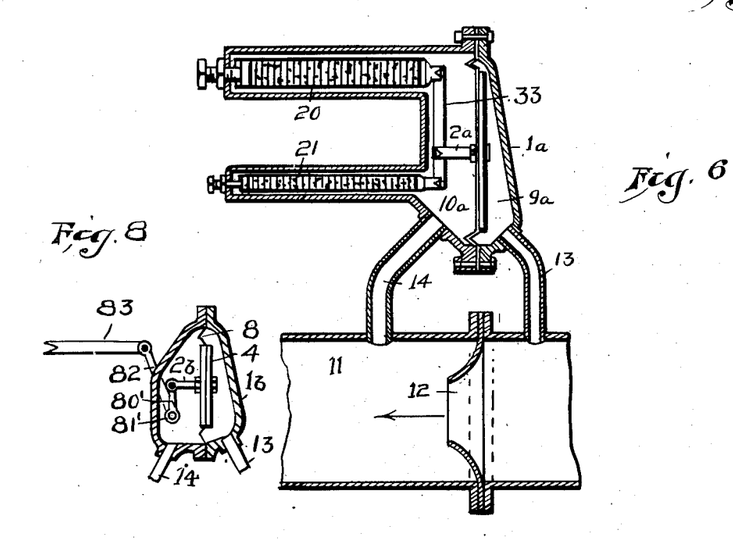
Fig. 6, a section of a flow meter in which some of the mechanical features of Fig. 1 are modified to permit the pressure-variable resistances to be mounted within the diaphragm casing, the electrical connections and instruments being omitted in this figure.
Fig. 8 is sectional fragment showing a modification of a portion of Fig. 1.

Refering now to Fig. 8 I show the casing 1b with closed ends and only one pair of disks 4 and one diaphragm 8. The diaphragm carries the stem 2b which is pivoted to the arm 80' of the rock-shaft 81' which has a bearing in the wall of the casing. The rock-shaft carries outside of the casing the arm 82 to which is pivoted the rod 83 having its outer end provided with a knife-edge notch for connection with the lever 33 of Fig. 1.

Figure 9:
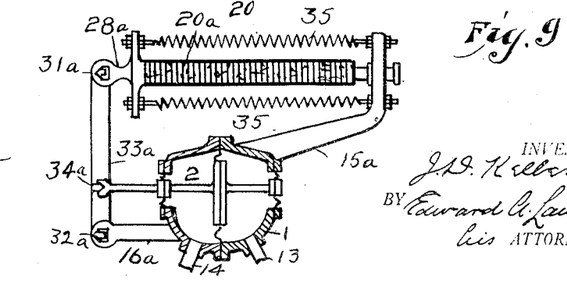
Fig. 9 is view partly in section and partly in elevation showing a second modification of Fig. 1.

Referring to Fig. 9 the stem 2 has the knife-edge connection 34a with the lever 33a whose ends have the knife-edge connections 31a and 32a, the former being carried by the arm 16a and the latter by the block 28a on the pile 20a. 35 are a pair of springs operating on the pile 20a to give it a relatively large initial heavy constant pressure. The disks of this pile may be placed in series with the resistance 53 or 58. The arrangement is such that the pressure difference acting either on the disks or the equivalent thereof decreases the total pressure acting between the units of the pile and thus increases its resistances, such proportions of the units, initial pressure, and resistance 53 or 58 being chosen that the ideal square root variation is approached as closely as possible. In most cases the use of this additional pile is unnecesary.

I claim—

1. In an apparatus for measuring the flow of fluids, an electric circuit, and pressure difference responsive means controlled by the fluid flow to vary a potential difference in the circuit at each instant substantially in proportion to the rate of fluid flow at that instant.

2. In an apparatus for measuring the flow of fluids, means for producing pressure differences which are proportional to the squares of the rates of flow, an electric circuit, and means controlled by the pressure differences to vary a potential difference in the circuit at each instant substantially in proportion to the square root of a pressure difference existing at that instant.

3. In an apparatus for measuring pulsating flow of fluids, means including quick-acting pressure-variable resistance elements controlled by the pulsating flow to vary the indications of an electric meter in accordance with the time average of the square roots of the instantaneous pressure differences produced by the flow.

4. In an apparatus for measuring the flow of fluids, an electric circuit, and pressure difference responsive means controlled by the fluid flow to vary the current in the circuit at each instant substantially in proportion to the rate of fluid flow at that instant.

5. In an apparatus for measuring the flow of fluids, means for producing pressure differences which are proportional to the squares of the rates of flow, an electric circuit, and means controlled by the pressure differences to vary the current in the circuit at each instant substantially in proportion to the square root of a pressure difference existing at that instant.

6. In an apparatus for measuring the flow of fluids, an electric circuit, means including pressure-variable resistance, and controlled by the rate of flow of the fluid to vary a potential difference in the circuit at each instant substantially in proportion to the said rate of flow of fluid at that instant.

7. In an apparatus for measuring the pulsating flow of fluids, an electric circuit, means including quick-acting pressure-variable resistance, and controlled by the rate of flow of the fluid to vary the potential difference of a current flowing in the circuit at each instant substantially in proportion to the said rate of flow of fluid at that instant, in combination with means for correcting those variations of resistance of the quick-acting pressure-variable means which may be caused by changes of temperature of the latter means.

8. In an apparatus for measuring the flow of fluids, an electric circuit, means including pressure-variable resistance containing carbon blocks, and controlled by the rate of flow of the fluid to vary the potential difference of a current flowing in the circuit substantially in proportion to the said rate of flow of fluid.

9. In an apparatus for measuring the flow of fluids, a Wheatstone bridge circuit containing quick-acting pressure-variable resistance and an electric meter circuit, and means controlled at each instant by the flow of the fluid and acting on the pressure variable resistance to cause a potential difference in the circuit which varies at each instant substantially as the square root of a pressure difference existing at that instant.

10. In an apparatus for measuring the flow of fluids, a Wheatstone bridge containing pressure-variable resistance and a meter circuit, and means controlled by the flow of the fluid and acting on the pressure variable resistance to cause a potential difference in the circuit which varies at each instant substantially as the square root of a pressure difference existing at that instant, in combination with means for correcting the potential difference acting on the meter in accordance with the varying density of the fluid at that instant.

11. In an apparatus for measuring the flow of fluids, a Wheatstone bridge containing pressure-variable resistance and an electric meter circuit, and means controlled by the flow of the fluid and acting on the pressure variable resistance to cause a potential difference in the circuit which varies at each instant substantially as the square root of a pressure difference existing at that instant, in combination with means including pressure-variable resistance for correcting the potential difference acting on the meter in accordance with the varying density of the fluid at that instant.

12. In an apparatus for measuring the flow of fluids, a Wheatstone bridge containing pressure-variable resistance and an electric meter circuit, and means controlled by the flow of the fluid and acting on the pressure variable resistance to cause a potential difference in the circuit which varies substantially as the square root of a pressure difference, in combination with a pressure-variable resistance containing cabon blocks for correcting the potential difference acting on the meter in accordance with the varying density of the fluid.

13. In an apparatus for measuring the flow of fluids, a Wheatstone bridge containing pressure-variable resistance and an electric meter circuit, and means controlled by the flow of the fluid and acting on the pressure variable resistance to cause a potential difference in the circuit which varies at each instant substantially as the square root of a pressure difference existing at that instant, in combination with means controlled by the fluid for correcting the potential difference acting on the meter in accordance with the varying density of the fluid at that instant.

14. In an apparatus for measuring the flow of fluids, means for producing pressure differences which are proportional to the squares of the rates of flow; an electric circuit containing a meter, and means including quick-acting pressure-difference-responsive means controlled by the pressure differences to vary the potential difference applied to the meter at each instant substantially in proportion to the square root of the pressure difference existing at that instant; in combination with quick-acting means for correcting the potential difference applied to the meter in accordance with the instantaneous density of the fluid flowing.

15. In an apparatus for measuring the flow of fluids, an electric circuit containing a meter, means including pressure-variable resistance, and controlled by the rate of flow of the fluid to vary the potential difference of a current flowing at each instant in the circuit substantially in proportion to the said rate of flow existing at that instant in combination with means for correcting the potential difference applied to the meter in accordance with the varying density of the fluid at that instant.

16. In an apparatus for measuring the flow of fluids, an electric circuit, a casing containing a diaphragm whose opposite sides are subject to a differential of pulsating pressure flow of the fluid, means including quick acting pressure-difference-responsive resistance controlled by the diaphragm to vary the potential difference of a current in the circuit at each instant substantially in proportion to the rate of flow of the fluid at that instant.

17. In an apparaus for measuring the flow of fluids, two pressure-variable resistances each composed of carbon blocks, and means whereby the unit pressure exerted upon one of the resistances is always a constant multiple of the unit pressure exerted upon the other resistance.

18. In an apparatus for measuring the pulsating flow of fluids, means for producing a differential pressure caused by the pulsating flow, two quick-acting pressure-variable resistances each composed of carbon blocks, means whereby the unit pressure exerted upon one of the resistances by the differential pressure is always a constant multiple of the unit pressure exerted upon the other resistance by the said differential pressure, and means connecting the resistances electrically in a Wheatstone bridge circuit so as to cause an electric potential or current to vary substantially in proportion to the rate of flow of the fluid.

19. In an apparatus for measuring the flow of fluids, a circuit, a pressure-variable resistance therein, composed of carbon blocks, and a thermostatic compensator for maintaining constant resistance characteristics in the circuit at all temperatures, said compensator containing means for varying the number of said blocks in the circuit.

20. In a meter for registering oscillating flow of a fluid through an orifice, an electric meter, and means for producing for each rate of back flow, an electric potential whose ratio to the potential produced by the same rate of forward flow is equal to the ratio of the coefficient of discharge for back flow to the coefficient of discharge for forward flow.

21. In an apparatus for measuring fluid flow, quick-acting pressure-variable resistances composed of carbon blocks, a casing surrounding the resistances and in communication with the fluid being measured, an electric meter circuit containing a source of electrical energy and means controlled by the flow of the fluid and acting on the pressure variable resistances to cause a potential difference in the circuit which varies at each instant substantially as the square root of the pressure difference produced at that instant by the fluid flow.

22. In an apparatus for integrating the total flow of fluids over an extended period of time, an electric circuit and means including quick-acting pressure-variable resistance elements, controlled by the fluid flow to vary a potential difference in the circuit at each instant substantially in proportion to the rate of flow of the fluid at that instant, and to apply said potential difference to the voltage terminals of a watthour-meter; in combination with means, including pressure-variable resistance elements, for varying an electric current flowing at each instant through the ampere or current-coils of said watthour-meter substantially in proportion to the square root of the density of the fluid flowing at that instant.

23. In an apparatus for indicating the total flow of fluids, an electric circuit, and means including pressure-variable resistance elements, controlled by the fluid flow to vary a potential difference in the circuit at each instant substantially proportional to the square root of a pressure difference existing at that instant produced by the rate of flow, and to apply said potential difference to the voltage terminals of a wattmeter; in combination with means, including pressure-variable resistance elements, for varying an electric current flowing at each instant through the ampere or current-coils of said wattmeter substantially in proportion to the square root of the density of the fluid flowing at that instant.

In testimony whereof I hereunto affix my signature this 28th day of July, 1922.

JOHN DONALD KELLER.